(12) United States Patent
Kawasaki et al.

(10) Patent No.: US 11,671,542 B2
(45) Date of Patent: Jun. 6, 2023

(54) INFORMATION PROCESSING SYSTEM, POSITION MANAGEMENT METHOD, INFORMATION PROCESSING APPARATUS, AND STORAGE MEDIUM

(71) Applicants: Hajime Kawasaki, Chiba (JP); Makoto Aoki, Tokyo (JP)

(72) Inventors: Hajime Kawasaki, Chiba (JP); Makoto Aoki, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/695,835

(22) Filed: Mar. 16, 2022

(65) Prior Publication Data

US 2022/0303410 A1  Sep. 22, 2022

(30) Foreign Application Priority Data

Mar. 19, 2021  (JP) .............................. JP2021-046635

(51) Int. Cl.
*H04N 1/00* (2006.01)
*H04N 1/32* (2006.01)

(52) U.S. Cl.
CPC ..... *H04N 1/00477* (2013.01); *H04N 1/32005* (2013.01); *H04N 1/32352* (2013.01)

(58) Field of Classification Search
CPC .................................................. H04N 1/00477
USPC ........................................................ 358/1.15
See application file for complete search history.

(56) References Cited

U.S. PATENT DOCUMENTS

2015/0062640 A1  3/2015  Shigenobu
2020/0034592 A1  1/2020  Kawasaki et al.
2020/0293239 A1  9/2020  Kawasaki et al.
2021/0132874 A1  5/2021  Kawasaki et al.
2021/0240957 A1  8/2021  Kawasaki et al.
(Continued)

FOREIGN PATENT DOCUMENTS

| EP | 2 372 627 A2 | 10/2011 |
|---|---|---|
| JP | 2017-199306 | 11/2017 |
| JP | 2020-021181 | 2/2020 |

(Continued)

OTHER PUBLICATIONS

Extended European Search Report dated Sep. 12, 2022 in European Patent Application No. 22162098.2, 9 pages.

*Primary Examiner* — Jacky X Zheng
(74) *Attorney, Agent, or Firm* — Xsensus LLP

(57) ABSTRACT

An information processing system includes image capturing devices, an information processing apparatus, and processing circuitry. The image capturing devices are disposed to capture images of a management area. The information processing apparatus recognizes a code image corresponding to an object to be managed in the management area, from a captured image captured by the image capturing devices, and manages a location of the object. The processing circuitry sets address identification information associated with position information in the management area to a region of the captured image; based on recognition of the code image in the region, manages the position information associated with the address identification information set for the region, as a location of the object corresponding to the code image; and commonly sets one piece of the address identification information associated with the position information, for regions of different captured images captured by the image capturing devices.

11 Claims, 20 Drawing Sheets

(56) References Cited

U.S. PATENT DOCUMENTS

2021/0294548 A1    9/2021   Kawasaki et al.
2021/0297553 A1    9/2021   Kawasaki et al.

FOREIGN PATENT DOCUMENTS

| JP | 2020-022014 | 2/2020 |
| JP | 2020-024658 | 2/2020 |
| JP | 2020-155118 | 9/2020 |
| JP | 2021-149342 | 9/2021 |
| JP | 2021-149343 | 9/2021 |
| JP | 2021-149945 | 9/2021 |

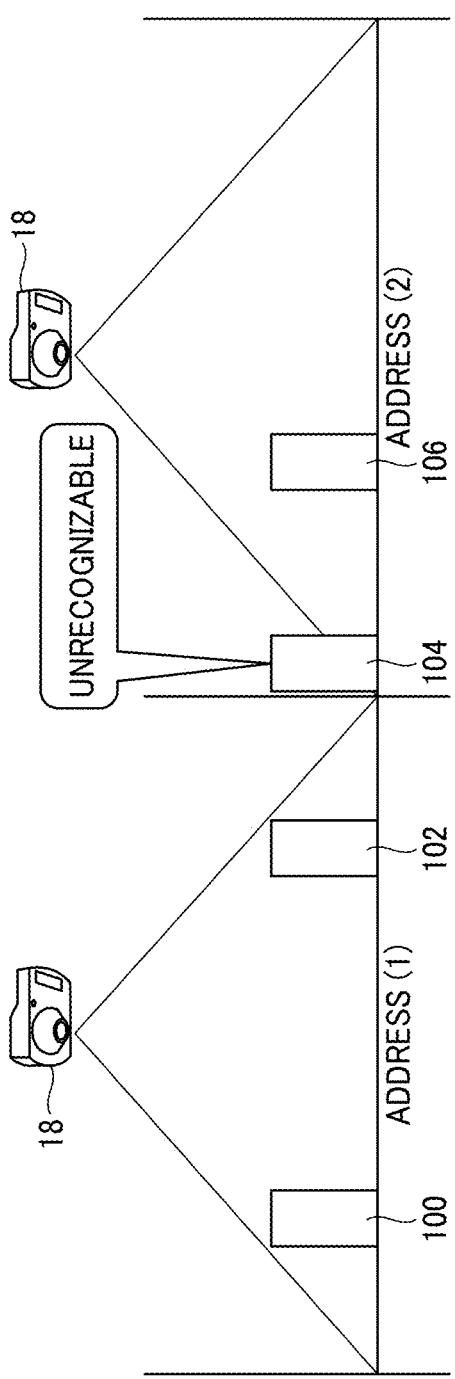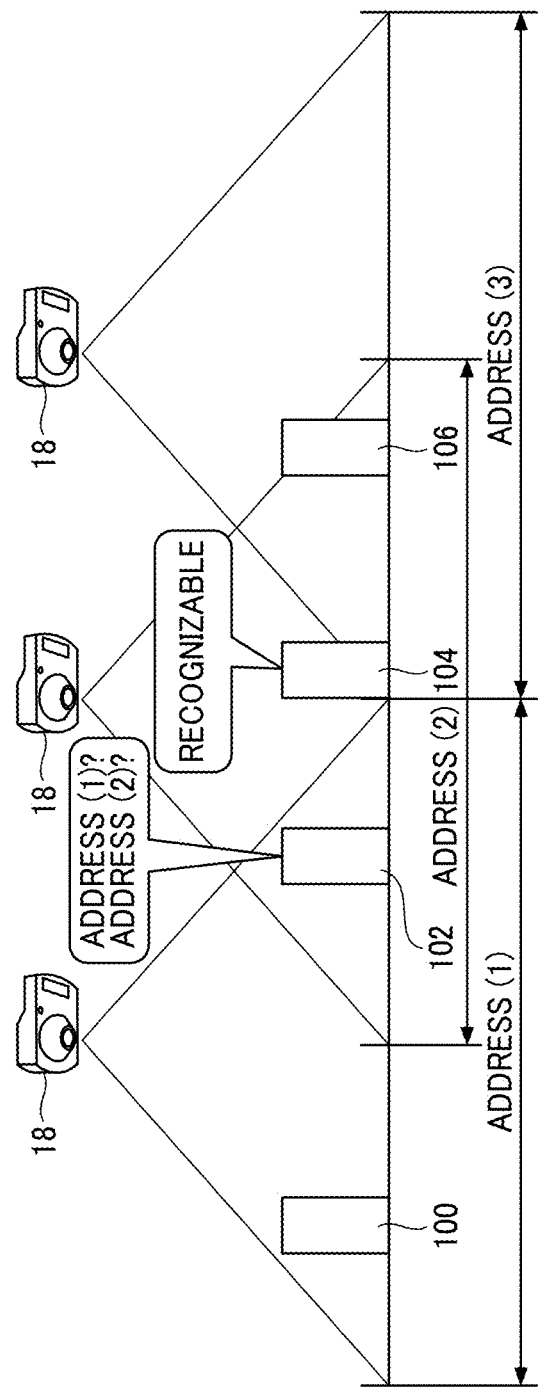
FIG. 5A
FIG. 5B

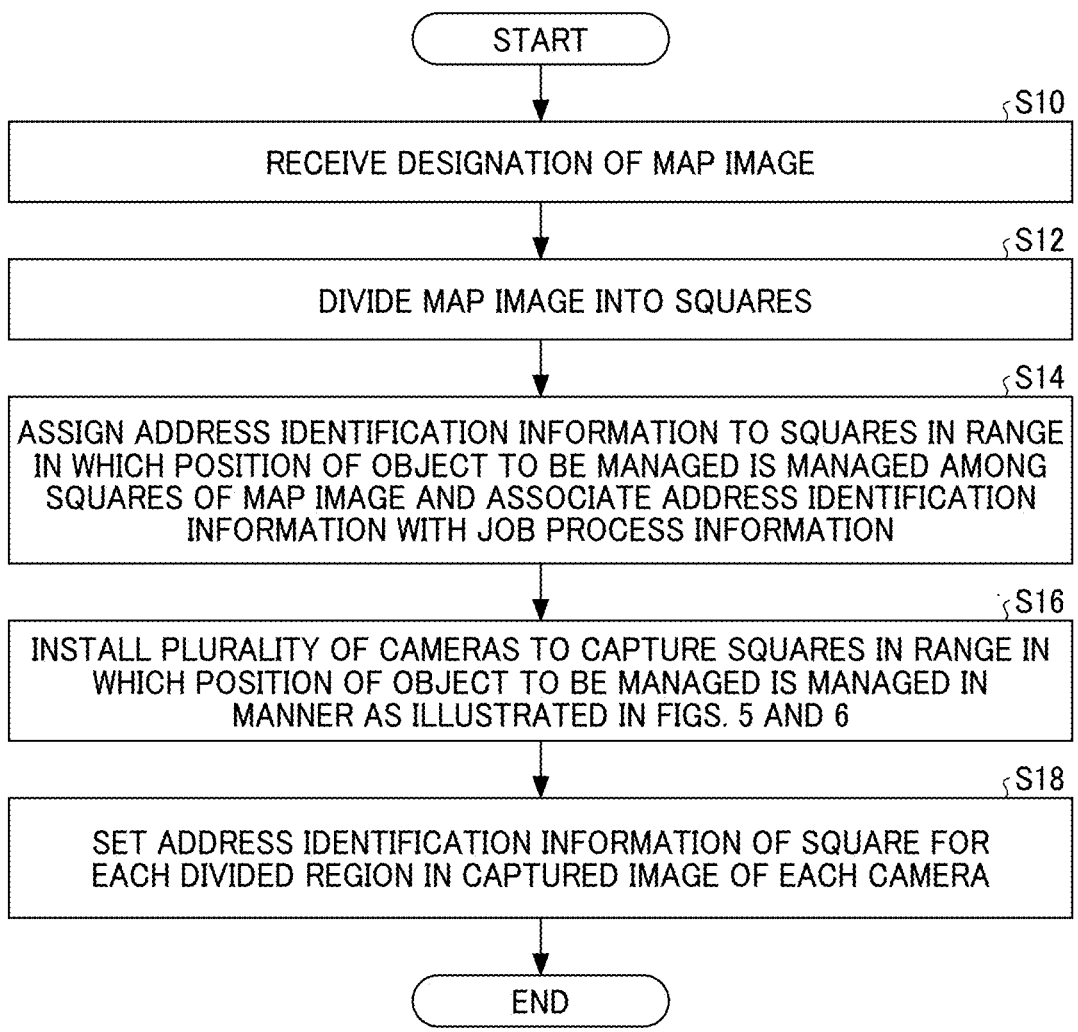

FIG. 9

GRID SETTING

[Floor plan grid view, labeled 1000, with NEXT button]

- ● INPUT NUMBER OF SQUARES
  [20] COLUMNS × [10] ROWS
- ○ AUTOMATICALLY SET NUMBER OF SQUARES
  FLOOR SIZE
  [ ] m × [ ] m

FIG. 10

ADDRESS SETTING

PROCESS LIST
(1) PROCESS A   DONE
(2) PROCESS B   DONE
(3) PROCESS C   DONE
(4) PROCESS D   DONE
(5) PROCESS E   DONE
(6) PROCESS F   DONE
(7) PROCESS G   DONE
(8) PROCESS H
(9) PROCESS I
(10) PROCESS J
(11) PROCESS K
(12) PROCESS L

NEXT

FIG. 12

| SETTING INFORMATION | | | |
|---|---|---|---|
| CAMERA IDENTIFICATION INFORMATION | ADDRESS IDENTIFICATION INFORMATION | REGION OF DIVIDED IMAGE IN CAPTURED IMAGE | JOB PROCESS INFORMATION |
| CAMERA A | ADDRESS (1) | (x,y) = (0,0) – (50,50) UPPER LEFT OF CAPTURED IMAGE | PROCESS A |
| CAMERA A | ADDRESS (2) | (x,y) = (50,0) – (100,50) UPPER RIGHT OF CAPTURED IMAGE | PROCESS A |
| CAMERA A | ADDRESS (4) | (x,y) = (0,50) – (50,100) LOWER LEFT OF CAPTURED IMAGE | PROCESS A |
| CAMERA A | ADDRESS (5) | (x,y) = (50,50) – (100,100) LOWER RIGHT OF CAPTURED IMAGE | PROCESS A |
| CAMERA B | ADDRESS (2) | (x,y) = (0,0) – (50,50) UPPER LEFT OF CAPTURED IMAGE | PROCESS A |
| CAMERA B | ADDRESS (3) | (x,y) = (50,0) – (100,50) UPPER RIGHT OF CAPTURED IMAGE | PROCESS A |
| CAMERA B | ADDRESS (5) | (x,y) = (0,50) – (50,100) LOWER LEFT OF CAPTURED IMAGE | PROCESS A |
| CAMERA B | ADDRESS (6) | (x,y) = (50,50) – (100,100) LOWER RIGHT OF CAPTURED IMAGE | PROCESS A |
| CAMERA C | ADDRESS (4) | (x,y) = (0,0) – (50,50) UPPER LEFT OF CAPTURED IMAGE | PROCESS A |
| ... | ... | ... | ... |

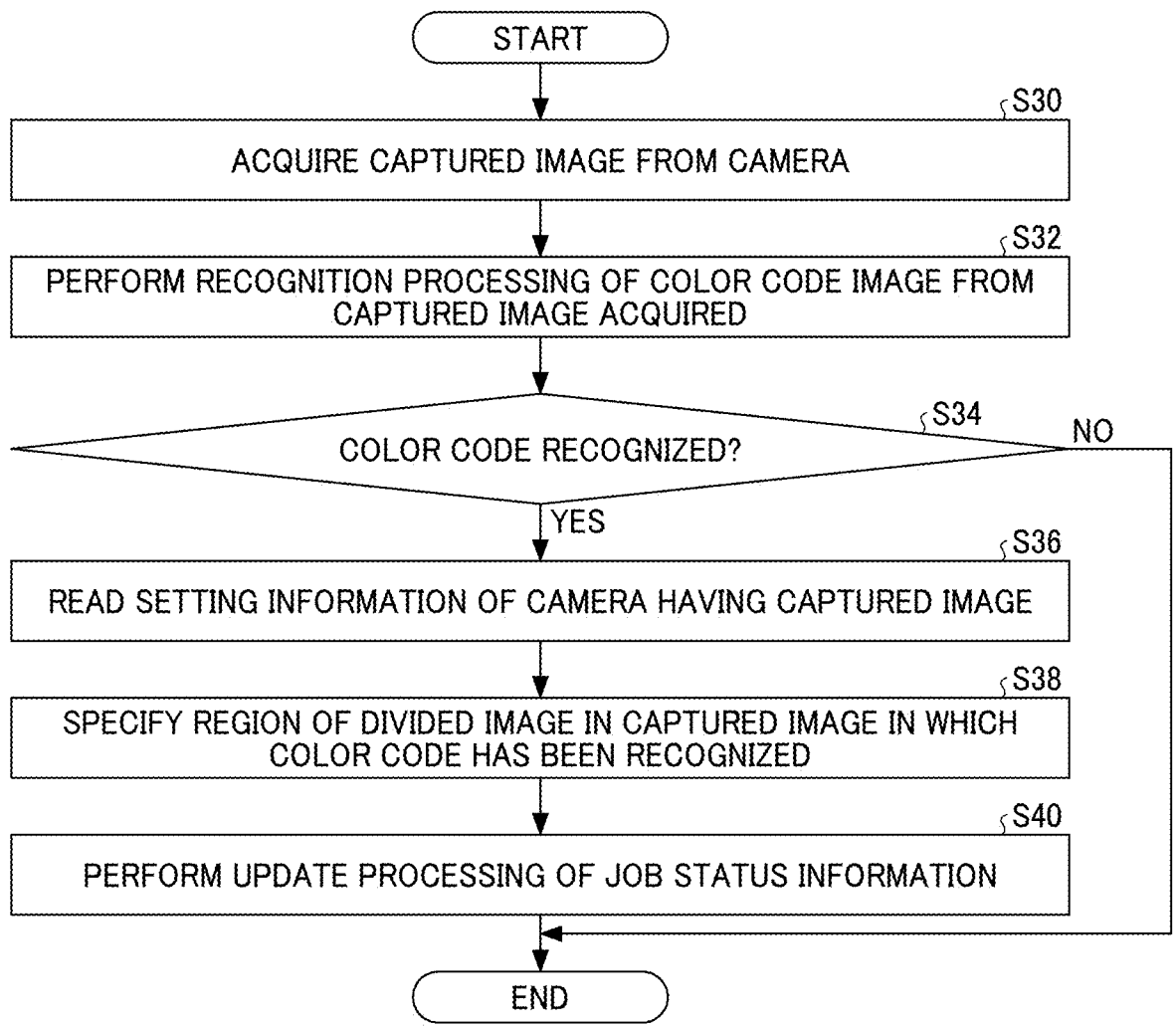

FIG. 14

| ADDRESS IDENTIFICATION INFORMATION | JOB PROCESS INFORMATION | STATUS |
|---|---|---|
| ADDRESS (1) | PROCESS A | |
| ADDRESS (2) | PROCESS A | |
| ADDRESS (3) | PROCESS A | |
| ADDRESS (4) | PROCESS A | |
| ADDRESS (5) | PROCESS A | JOB X |
| ADDRESS (6) | PROCESS A | |
| ADDRESS (7) | PROCESS A | |
| ADDRESS (8) | PROCESS A | |
| ADDRESS (9) | PROCESS A | |
| ADDRESS (10) | PROCESS B | |
| ADDRESS (11) | PROCESS B | |
| ADDRESS (12) | PROCESS B | |
| ... | ... | ... |

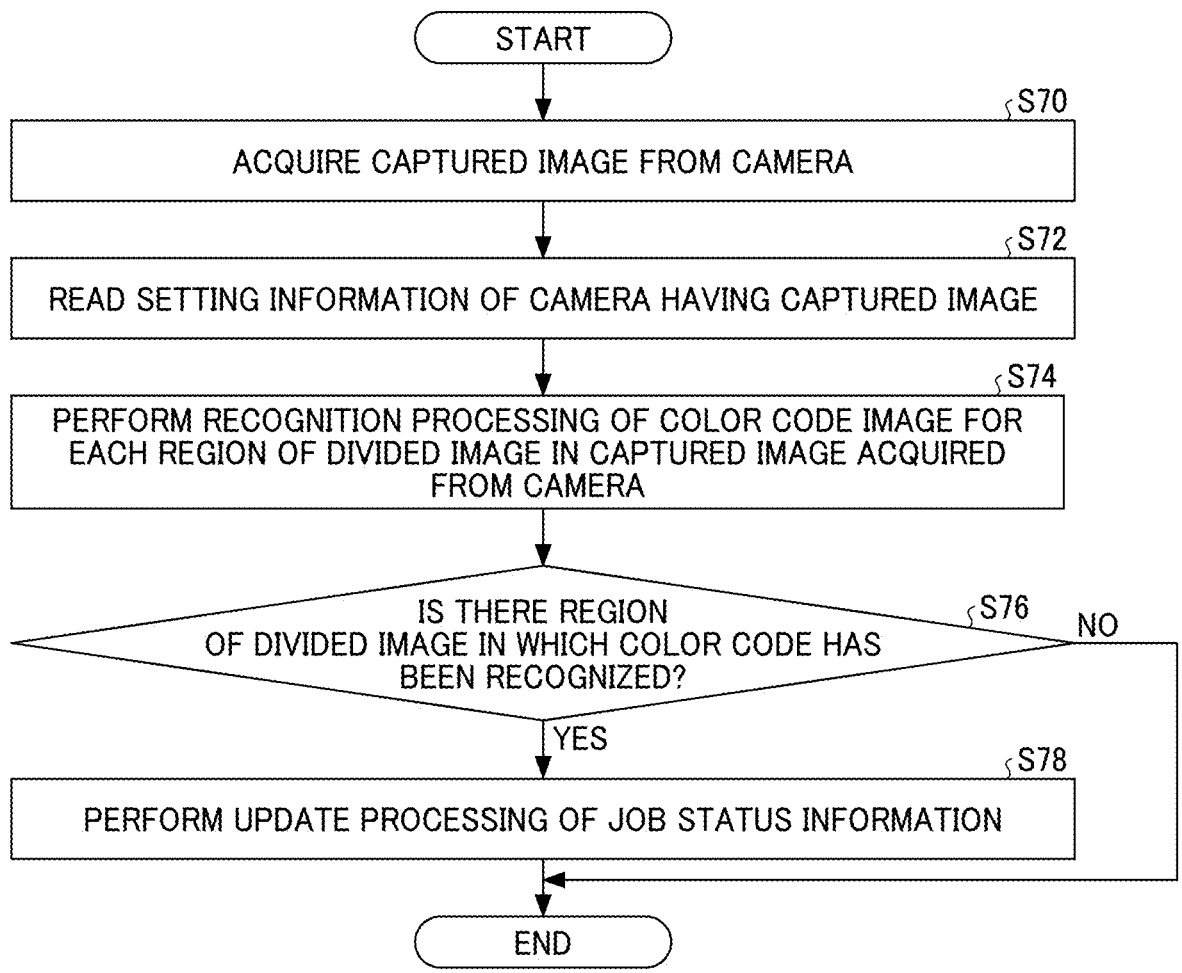

FIG. 17

UPDATE PROCESSING OF JOB STATUS INFORMATION BASED ON CAPTURED IMAGE OF CAMERA A

| ADDRESS IDENTIFICATION INFORMATION | JOB PROCESS INFORMATION | STATUS |
|---|---|---|
| ADDRESS (1) | PROCESS A | |
| ADDRESS (2) | PROCESS A | |
| ADDRESS (3) | PROCESS A | |
| ADDRESS (4) | PROCESS A | |
| ADDRESS (5) | PROCESS A | JOB X |
| ADDRESS (6) | PROCESS A | |
| ADDRESS (7) | PROCESS A | |
| ADDRESS (8) | PROCESS A | |
| ADDRESS (9) | PROCESS A | |
| ADDRESS (10) | PROCESS B | |
| ADDRESS (11) | PROCESS B | |
| ADDRESS (12) | PROCESS B | |
| ... | ... | ... |

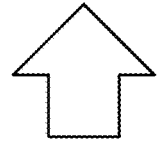

UPDATE PROCESSING OF JOB STATUS INFORMATION BASED ON CAPTURED IMAGE OF CAMERA B

| ADDRESS IDENTIFICATION INFORMATION | JOB PROCESS INFORMATION | STATUS |
|---|---|---|
| ADDRESS (1) | PROCESS A | |
| ADDRESS (2) | PROCESS A | |
| ADDRESS (3) | PROCESS A | |
| ADDRESS (4) | PROCESS A | |
| ADDRESS (5) | PROCESS A | |
| ADDRESS (6) | PROCESS A | JOB X |
| ADDRESS (7) | PROCESS A | |
| ADDRESS (8) | PROCESS A | |
| ADDRESS (9) | PROCESS A | |
| ADDRESS (10) | PROCESS B | |
| ADDRESS (11) | PROCESS B | |
| ADDRESS (12) | PROCESS B | |
| ... | ... | ... |

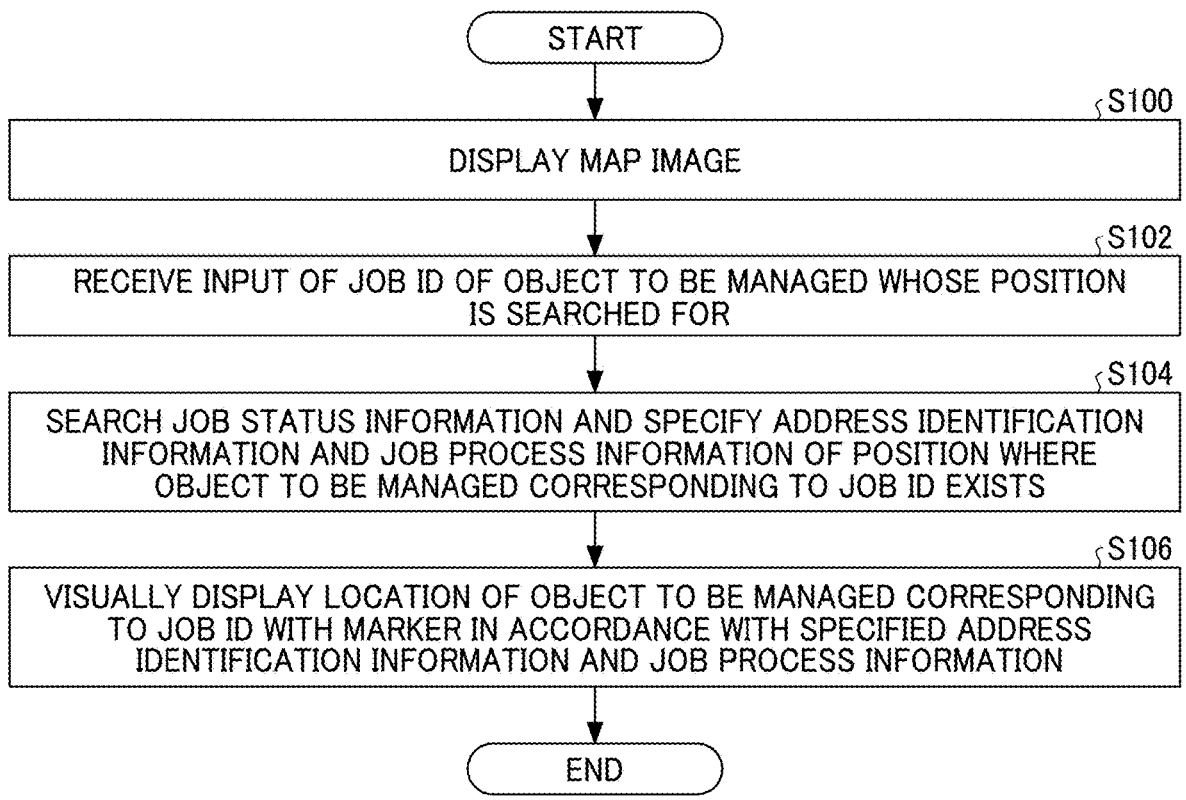

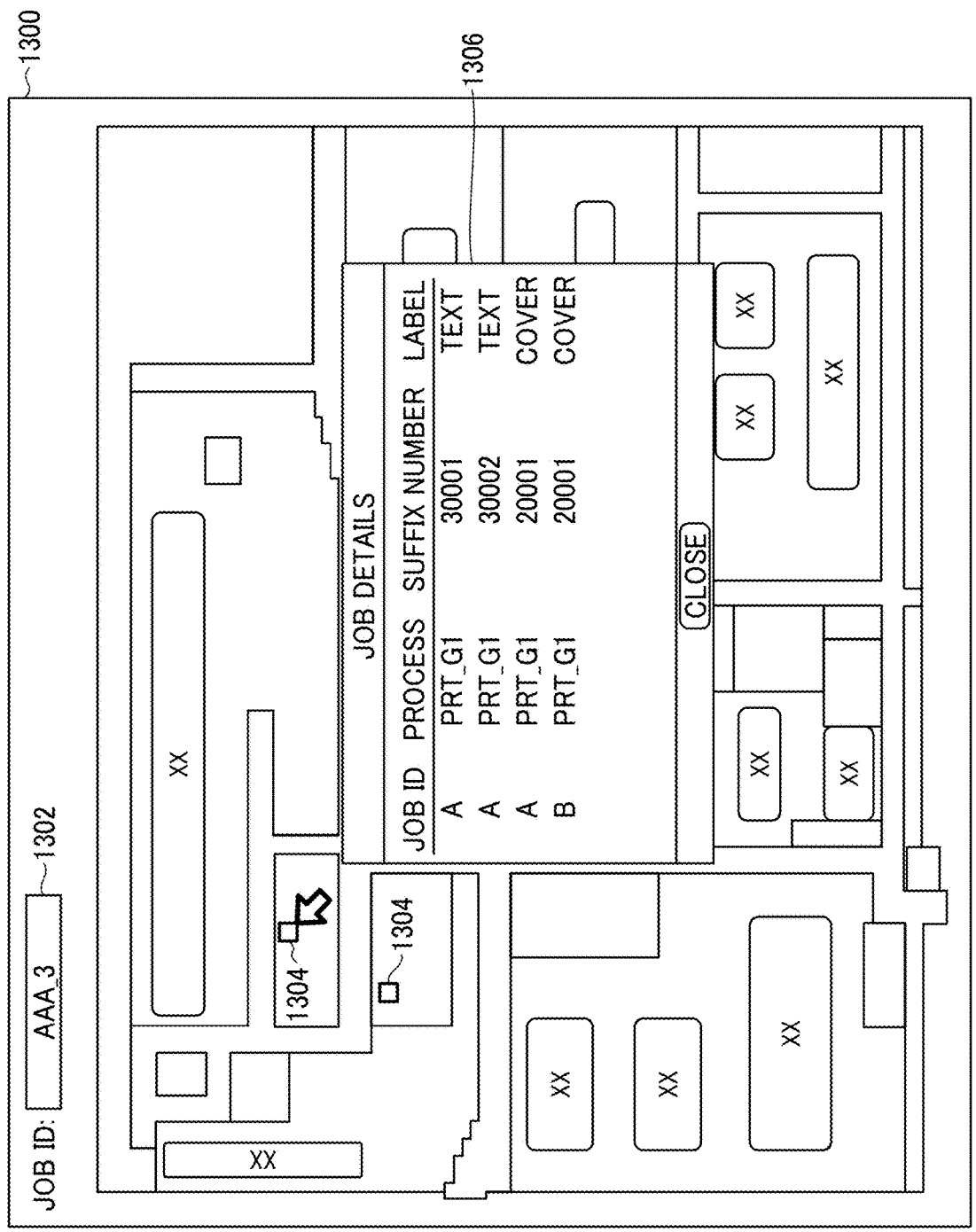

INFORMATION PROCESSING SYSTEM, POSITION MANAGEMENT METHOD, INFORMATION PROCESSING APPARATUS, AND STORAGE MEDIUM

CROSS-REFERENCE TO RELATED APPLICATION

This patent application is based on and claims priority pursuant to 35 U.S.C. § 119(a) to Japanese Patent Application No. 2021-046635, filed on Mar. 19, 2021, in the Japan Patent Office, the entire disclosure of which is hereby incorporated by reference herein.

BACKGROUND

Technical Field

Embodiments of the present disclosure relate to an information processing system, a location management method, an information processing apparatus, and a storage medium.

Related Art

Technologies are known for managing the progress of a job including a plurality of work processes by using a barcode or the like. For example, a technology is known in which a code image associated with a job is captured at each location associated with a work process, the job is recognized from the code image, and the work process associated with the captured location and the job recognized from the code image are managed in association with each other. In addition, a technology is known for managing a work process associated with a captured place and a job recognized from a code image in association with each other and providing information on the progress of a plurality of jobs including a plurality of work processes to a user.

SUMMARY

According to an embodiment of the present disclosure, there is provided an information processing system that includes a plurality of image capturing devices, an information processing apparatus, and processing circuitry. The plurality of image capturing devices are disposed to capture images of a management area. The information processing apparatus recognizes a code image corresponding to an object to be managed in the management area, from a captured image captured by the plurality of image capturing devices, and manages a location of the object to be managed. The processing circuitry sets address identification information associated with position information in the management area to a region of the captured image captured by the plurality of image capturing devices; based on recognition of the code image in the region of the captured image, manages the position information associated with the address identification information set for the region, as a location of the object to be managed corresponding to the code image; and commonly sets one piece of the address identification information associated with the position information in the management area, for regions of different captured images captured by the plurality of image capturing devices.

In another embodiment of the present disclosure, there is provided a position management method to be executed by an information processing system that includes a plurality of image capturing devices disposed to capture images of a management area and an information processing apparatus to recognize a code image corresponding to an object to be managed in the management area, from a captured image captured by the plurality of image capturing devices, and manage a location of the object. The method includes setting address identification information associated with position information in the management area to a region of the captured image captured by the plurality of image capturing devices; based on recognition of the code image in the region of the captured image, managing the position information associated with the address identification information set for the region, as a location of the object corresponding to the code image; and commonly setting one piece of the address identification information associated with the position information in the management area, for regions of different captured images captured by the plurality of image capturing devices.

In still another embodiment of the present disclosure, there is provided an information processing apparatus to recognize a code image corresponding to an object to be managed in a management area, from a captured image captured by a plurality of image capturing devices disposed to capture images of the management area, to manage a location of the object. The information processing apparatus includes processing circuitry. The processing circuitry sets address identification information associated with position information in the management area to a region of the captured image captured by the plurality of image capturing devices; based on recognition of the code image in the region of the captured image, manages the position information associated with the address identification information set for the region, as a location of the object to be managed corresponding to the code image; and commonly sets one piece of the address identification information associated with the position information in the management area, for regions of different captured images captured by the plurality of image capturing devices.

In still yet another embodiment of the present disclosure, there is provided a non-transitory recording medium storing a plurality of instructions which, when executed by one or more processors, cause the processors to perform the position management method.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIGS. 5A and 5B are diagrams illustrating examples of the installation positions of cameras and the positions of an object to be managed whose positions can be specified by the cameras;

FIG. 8 is a flowchart illustrating an example of a preparation process of an information processing system according to an embodiment of the present disclosure;

FIG. 9 is an image diagram illustrating an example of a grid setting screen;

FIG. 10 is an image diagram illustrating an example of an address setting screen;

FIG. 12 is a diagram illustrating an example of the configuration of setting information according to an embodiment of the present disclosure;

FIG. 13 is a flowchart illustrating an example of a management process of an information processing system according to an embodiment of the present disclosure;

FIG. 14 is a diagram illustrating an example of the configuration of job status information according to an embodiment of the present disclosure;

FIG. 16 is a flowchart illustrating an example of a management process of a job management system according to an embodiment of the present disclosure;

FIG. 17 is a diagram illustrating an example of the configuration of job status information in a case where update processing of job status information using an image captured by a camera is performed after update processing of the job status information using an image captured by another camera;

FIG. 18 is a flowchart illustrating an example of a map display process of a job management system according to an embodiment of the present disclosure;

FIG. 20 is an image diagram illustrating an example of another map screen of a job management system according to an embodiment of the present disclosure.

Figure 1:
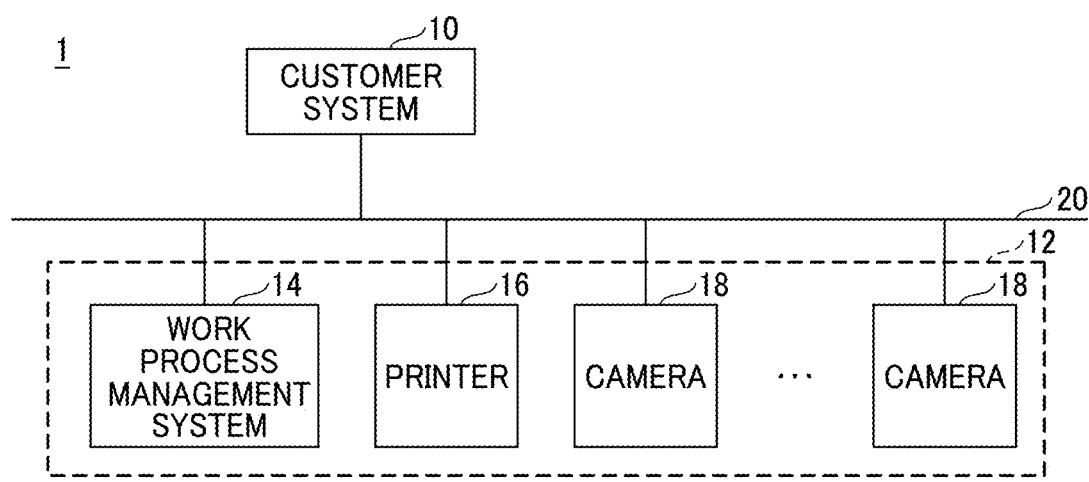
FIG. 1 is a diagram illustrating a configuration of a job management system according to an embodiment of the present disclosure.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, embodiments are described with reference to the drawings. In each drawing, the same configuration shares the same reference numeral and the overlapped description is omitted.

Hereinafter, embodiments of the present disclosure are described with reference to the drawings. In an embodiment of the present disclosure, an information processing system is described that recognizes the position of a color code image, which is an example of a code image, to achieve management of a job operation process in a printing factory. However, embodiments of the present disclosure are not limited to the printing factory. For example, embodiments of the present disclosure can also be applied to position recognition of various management objects such as position recognition of products in a factory and position recognition of delivery items in a collection place or a warehouse.

First Embodiment

System Configuration

FIG. 1 is a diagram illustrating a configuration of a job management system according to an embodiment of the present disclosure. FIG. 2 is an image diagram illustrating an example of a work instruction form used in the job management system according to the present embodiment. Ina job management system 1 of FIG. 1, a customer system 10, a work process management system 14, a printer 16, and one or more cameras 18 are connected via a network 20 such as the Internet or a local area network (LAN) so as to be capable of data communications.

Figure 2B:
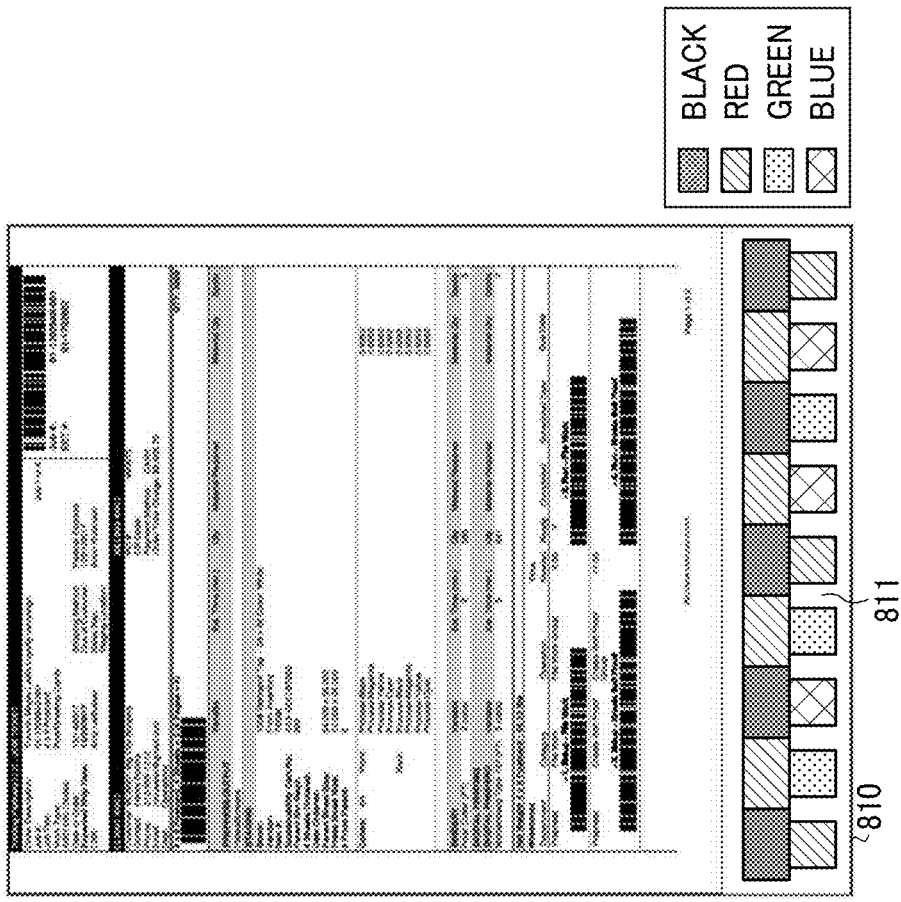
FIGS. 2A and 2B are image diagrams illustrating examples of a work instruction form used in the job management system of FIG. 1.
Figure 2A:
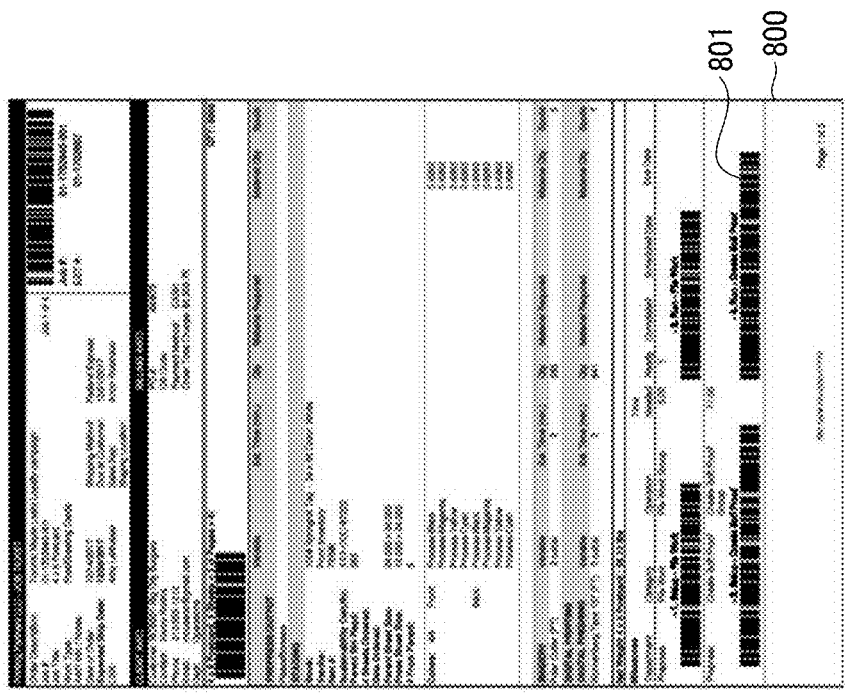

The customer system 10 is an example of an existing system used by a customer and creates a work instruction form 800 for the customer system 10 in FIG. 2A in which a job identification (ID) is displayed. The job ID is an example of identification information for identifying a job. In the work instruction form 800 for the customer system 10 in FIG. 2A, a barcode image 801 used on the customer system 10 is displayed.

Note that the job ID may be displayed as a barcode image 801 in the work instruction form 800 for the customer system 10 or may be displayed as text. The customer system 10 provides a user with an existing function achieved by the work instruction form 800 for the customer system 10.

The work process management system 14, the printer 16, and the one or more cameras 18 constitute at least part of an information processing system 12 that adds a new function to the work instruction form 800. The work process management system 14 manages the progress of a job including a plurality of work processes using a work instruction form 810 for the information processing system 12 to which a color code image 811 illustrated in FIG. 2B is assigned, as described below. The information processing system 12 can identify a job ID from the color code image 811 as described below.

The printer 16 prints the work instruction form 810 for the information processing system 12. The work instruction form 810 for the information processing system 12 may be referred to as a work instruction form provided with a color code image. The cameras 18 are installed so as to be able to capture positions associated with work processes of a job in a printing factory. The positions associated with the work processes of the job are one or more locations corresponding to the work processes described below. The positions associated with the work processes of the job are, for example, places included in a range in which the position of an object to be managed is managed, for example, a place through which an object to be managed such as a printed matter passes by movement between the work processes, or a storage place, a table, a rack, or a room that is a temporary storage place where an object to be managed is temporarily stored. The range in which the position of the object to be managed is managed is a management area in which the object to be managed and a code image corresponding to the object to be managed are located and that is captured by the cameras 18.

For example, a pan tilt zoom (PTZ) camera or an Internet protocol (IP) camera can be used as the camera 18. The PTZ camera is a camera capable of operating pan, tilt, and zoom functions via the network 20, and is a camera capable of transmitting a captured image or a captured moving image via the network 20. The IP camera is a camera that can be operated via the network 20 and can transmit a captured image or a captured moving image via the network 20. A captured image or a captured moving image captured by the camera 18 is transmitted to the work process management system 14 via the network 20. The camera 18 is an example of an image capturing device.

In the information processing system 12 in which a new function is added to the work instruction form 800, the work instruction form 810 for the information processing system 12 is attached to a printed matter that is an example of an intermediate product or a material of a job corresponding to the work instruction form 810. For example, the work instruction form 810 is attached on an object to be managed such as a printed matter that is easily captured by the cameras 18.

The work process management system 14 recognizes a color code image of a work instruction form from images captured by the respective cameras 18, and thus manages management information such as the location of an object to be managed and a work situation as described below. The work process management system 14 also grasp and manage the position of a corresponding object to be managed using a code image, and thus manages the progress of a work process (job state) of a production process such as a job. The work process management system 14 may manage a history of work processes of a job, and a captured image or a captured moving image representing a state when the work instruction form 810 is captured. The management information managed by the work process management system 14 is updated and accumulated as needed in accordance with image capturing by the cameras 18, and stored as information that can be displayed on the user interface.

The configuration of the job management system 1 illustrated in FIG. 1 is an example. For example, the job management system 1 may include another system, or the work process management system 14 may be another name such as an information processing apparatus. The work process management system 14 may be implemented by a single server environment or by a plurality of server environments.

Hardware Configuration

Figure 3:
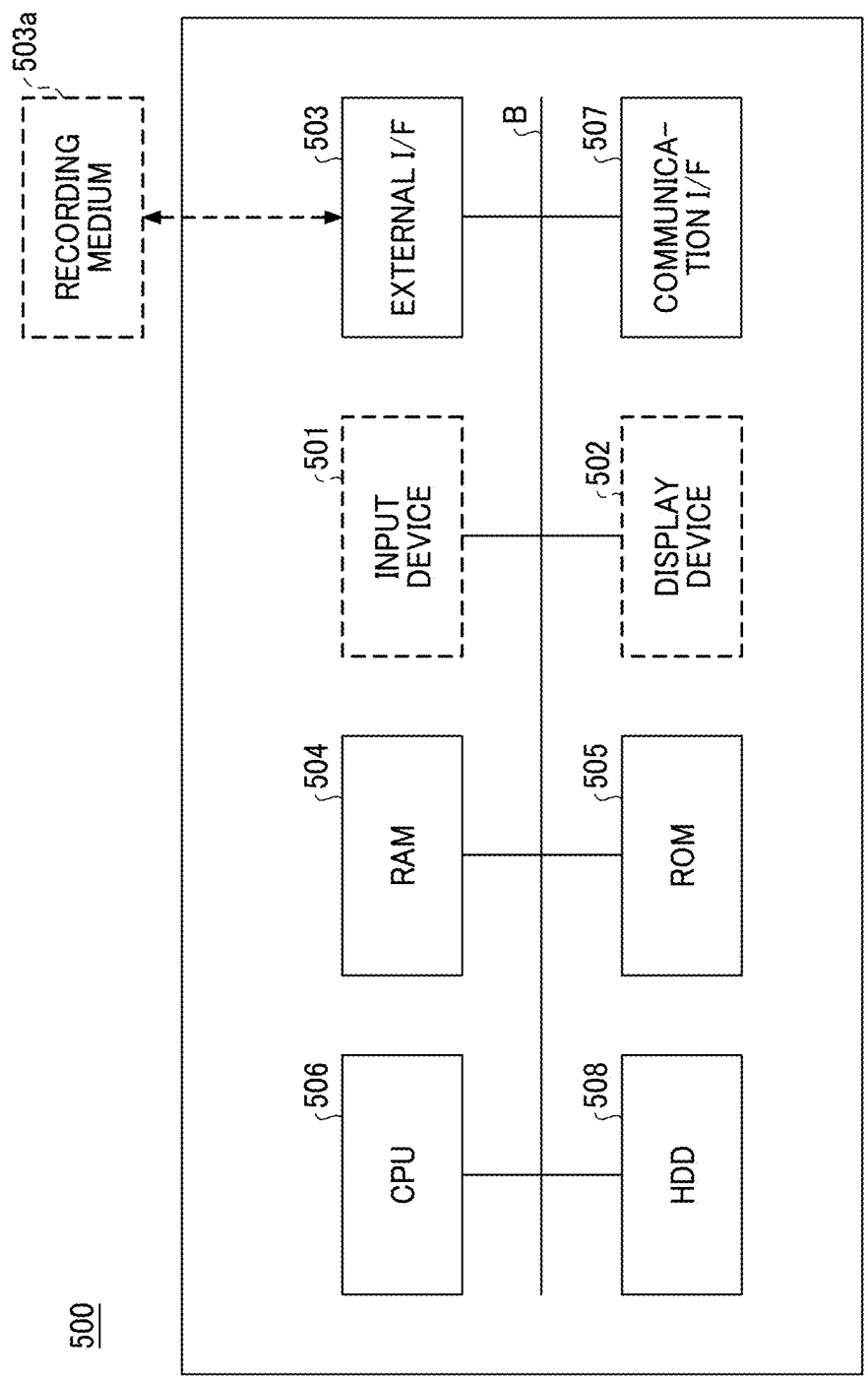
FIG. 3 is a diagram illustrating a hardware configuration of a computer according to an embodiment of the present disclosure.

The customer system 10 and the work process management system 14 are implemented by, for example, a computer 500 having a hardware configuration illustrated in FIG. 3.

FIG. 3 is a diagram illustrating a hardware configuration of a computer according to an embodiment of the present disclosure. A computer 500 of FIG. 3 includes, for example, an input device 501, a display device 502, an external interface (I/F) 503, a random access memory (RAM) 504, a read-only memory (ROM) 505, a central processing unit (CPU) 506, a communication I/F 507, a hard disk drive (HDD) 508 that are connected to each other by a bus B. Note that the input device 501 and the display device 502 may be connected and used when necessary.

The input device 501 includes, for example, a keyboard, a mouse, and a touch screen and is used by a user to input various operation signals. The display device 502 includes, for example, a display and displays a processing result by the computer 500.

The communication I/F 507 is an interface for connecting the computer 500 to various networks. Thus, the computer 500 can perform data transmission via the communication I/F 507.

The HDD 508 is an example of a non-volatile storage device that stores programs and information. The stored programs and data include an operating system (OS), which is basic software for controlling the entire computer 500, and application software (hereinafter simply referred to as "application") for providing various functions on the OS. Instead of the HDD 508, the computer 500 may include a drive device (for example, a solid state drive (SSD)) that uses a flash memory as a storage medium.

The external I/F 503 is an interface with an external device. Examples of the external device include a recording medium 503a. Such a configuration allows the computer 500 to read from and write to the recording medium 503a via the external I/F 503. Examples of the recording medium 503a include flexible disks, compact discs (CDs), digital versatile discs (DVDs), secure digital (SD) memory cards, and universal serial bus (USB) memories.

The ROM 505 is an example of a nonvolatile semiconductor memory (storage device) that can hold programs and data even when the power is turned off. The ROM 505 stores programs such as a basic input/output system (BIOS), an operating system (OS) setting, and a network setting, which are executed when the computer 500 is activated. The RAM 504 is an example of a volatile semiconductor memory (storage device) that temporarily stores programs and data.

The CPU 506 is an arithmetic device that reads programs and information from a storage device such as the ROM 505 or the HDD 508 onto the RAM 504 and execute processing to achieve control and functions of the entire computer 500. The customer system 10 and the work process management system 14 can achieve various processes to be described below by a hardware configuration of a computer 500 as illustrated in FIG. 3, for example.

Software Configuration

Figure 4:
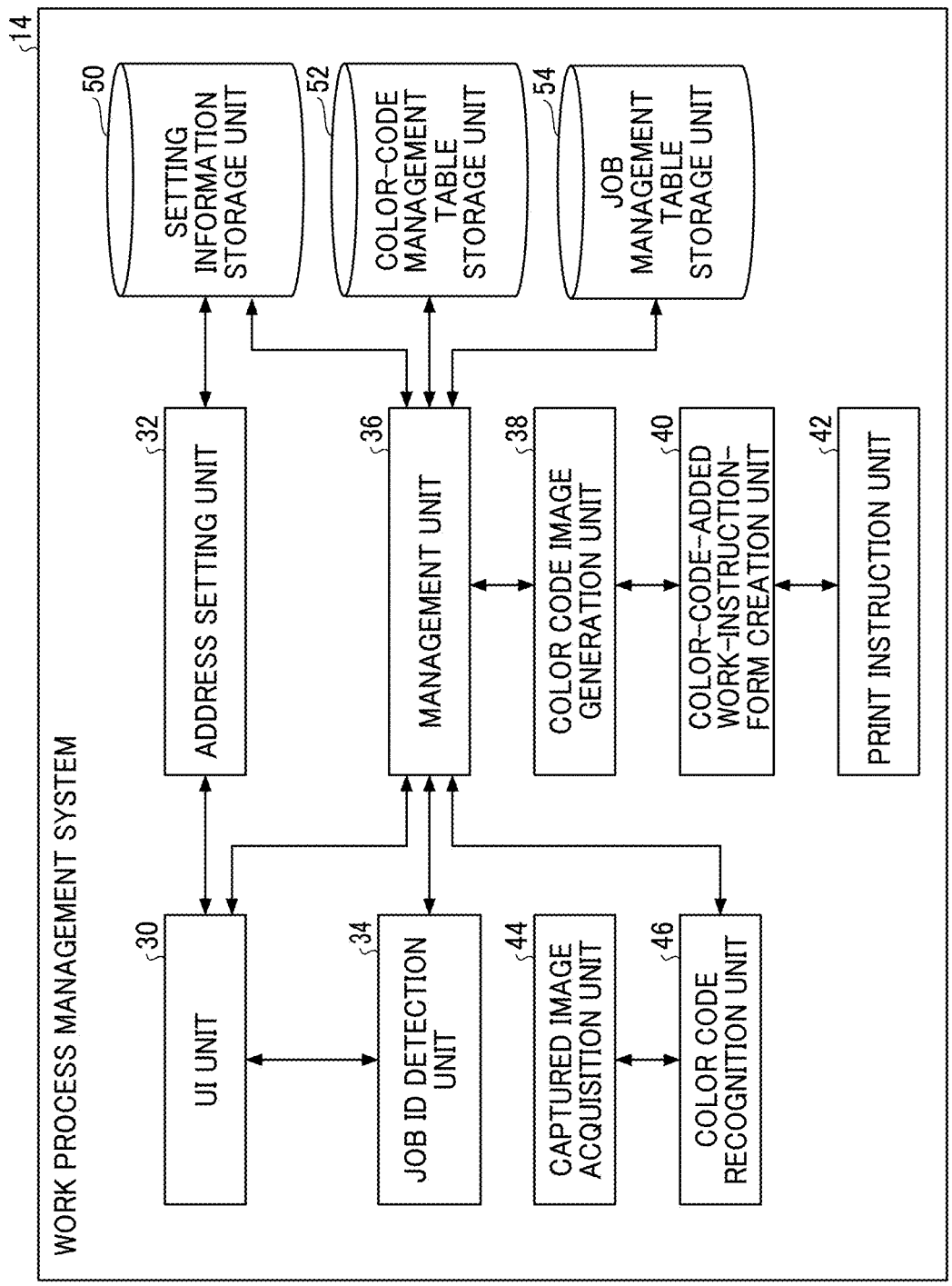
FIG. 4 is a diagram illustrating a functional configuration of a work process management system according to an embodiment of the present disclosure.

FIG. 4 is a diagram illustrating a functional configuration of the work process management system according to the present embodiment. In the diagram of the functional configuration illustrated in FIG. 4, configurations unnecessary for the description of the present embodiment are omitted as appropriate. The work process management system 14 illustrated in FIG. 4 includes a user interface (UI) unit 30, an address setting unit 32, a job ID detection unit 34, a management unit 36, a color code image generation unit 38, a color-code-added work-instruction-form creation unit 40, a print instruction unit 42, a captured image acquisition unit 44, a color code recognition unit 46, a setting information storage unit 50, a color-code management table storage unit 52, and a job management table storage unit 54.

The UI unit 30 controls the display of various screens such as various setting screens for receiving various necessary settings from a user and a map screen for visually displaying the location of an object to be managed as a marker. The address setting unit 32 receives setting of setting information, which will be described below, from a user, and controls processing of storing the setting information in the setting information storage unit 50. For example, the address setting unit 32 controls processing such as reception of designation of a map image including a layout or a floor plan of a management area that is a range for managing the position of an object to be managed, provision of address identification information to squares of divided map images, and association with job process information.

The address setting unit 32 divides a captured image captured by each camera 18 into four divided images, and sets, to each divided image in the captured image, address identification information capable of specifying a square of a map image captured by each divided image. The division in the captured image may be region setting divided in the captured image. The address setting unit 32 sets a plurality of divided regions in a captured image and specifies a square of a map image for each region to set address identification information.

The divided region is, for example, a rectangular region indicated by coordinates of a start point and an end point in the captured image. By this setting, the position information of a management area corresponding to the address identification information of a designated square of the map image and the divided image (divided region) in the captured image of each camera are stored in association with each other.

The position information in the management area includes coordinate information of a square to which the address identification information is assigned or identification information of each rectangle of the square in an image representing a map of the management area.

The address setting unit 32 can perform setting so as to designate the same address identification information even for divided images in captured images captured by different cameras 18 as long as the divided images capture an actual location corresponding to the position of the same square. Alternatively, features of images captured by different cameras 18 may be compared. If there is a similar region, the process may be controlled so that the same address identification information is set.

In this way, the same address identification information can be set for the divided images of the cameras 18 capturing the actual location corresponding to the position of the same square even if the cameras 18 are different. The address setting unit 32 is an example of an address setting unit. For example, the job ID detection unit 34 detects a job ID displayed as a barcode image 801 or text in the work instruction form 800 for the customer system 10 in FIG. 2A.

The management unit 36 stores and manages available color code IDs in the color-code management table storage unit 52. The management unit 36 selects an unused color code ID from the color-code management table storage unit 52. The management unit 36 manages the job ID detected by the job ID detection unit 34 and the selected color code ID in association with each other in the color-code management table storage unit 52. The management unit 36 is an example of a management unit.

The management unit 36 also stores and manages job information corresponding to the job ID and the color code ID in the job management table storage unit 54. The job management table storage unit 54 manages progress information, history information, and the like of job work processes, and such information is used for visually displaying the location of an object to be managed as a marker on a map screen described below.

The color code image generation unit 38 generates, for example, a color code image 811 illustrated in FIG. 2B from the color code ID provided from the management unit 36. For example, the color-code-added work-instruction-form creation unit 40 creates the work instruction form 810 for the information processing system 12 to which the color code image 811 of FIG. 2B is attached, from the work instruction form 800 for the customer system 10 of FIG. 2A. For example, the print instruction unit 42 instructs the printer 16 to print the work instruction form 810 for the information processing system 12 to which the color code image 811 of FIG. 2B is added.

The captured image acquisition unit 44 acquires a captured image or a captured moving image from the cameras 18. The color code recognition unit 46 recognizes a color code image 811 included in the captured image or the captured moving image. The color code recognition unit 46 decodes a color code ID from the recognized color code image 811. The color code recognition unit 46 provides, for example, camera identification information for identifying the camera 18 that has captured the color code image 811 and the decoded color code ID to the management unit 36.

Upon receiving the provided information, the management unit 36 specifies the job ID corresponding to the decoded color code ID by referring to the color-code management table storage unit 52. In addition, by referring to the setting information storage unit 50, the management unit 36 can specify a divided image or a divided region of the camera 18 that has recognized the color code image as described below, and can specify address identification information set in the specified divided image or divided region. The management unit 36 stores position information associated with address identification information set for each divided image or divided region, as a location of an object to be managed corresponding to a code image such as a color code, based on recognition of the code image in a divided image or divided region in the captured image. The management unit 36 stores the work process associated with the position information as the process in which the object to be managed is located. Thus, management information that is a status including the location of the object to be managed and the work situation (the process in which the object to be managed is located) is managed.

Furthermore, the management unit 36 can update job status information, which is described below, managed in the job management table storage unit 54 based on the work process of the job associated with the address identification information corresponding to the divided image (or divided region) of the camera 18 that has captured the color code image and the job ID corresponding to the decoded color code ID. When a code image is recognized in a region where one piece of address identification information is commonly set among regions of different captured images captured by a plurality of image capturing devices, the management unit 36 updates management information so that the object to be managed corresponding to the code image is located at the same position and in the same work process.

In some embodiments, each functional unit of the work process management system and the customer system may be configured as an information processing apparatus or a Web server on the Internet and provided as a cloud service. For example, the information processing apparatus may receive a request from a terminal device of a user via a network such as the Internet and return various screens, or may receive an input from a screen and execute setting. The information processing apparatus may also receive an image from an installed camera, recognize a code image, transmit a map screen to software such as a web browser of a terminal device, and update a position, a work situation, or the like of an object to be managed in real time using a bidirectional communication protocol.

Relation Between Camera Installation Position and Address Identification Information First, a description is given of the installation positions of the cameras 18 that capture images of positions associated with work processes of a job in a printing factory. FIG. 5 is a diagram illustrating an example of the installation positions of cameras and the positions of an object to be managed whose positions can be specified by the cameras. Each of objects to be managed (hereinafter, may be referred to as simply objects) 100, 102, 104, and 106 illustrated in FIG. 5 is assumed to be attached with a work instruction form including a color code image. The color code image is added at a position such as an upper surface of the work instruction form at which the color code image can be captured by the cameras 18.

FIG. 5A illustrates the installation positions of the cameras 18 in which a left camera 18 having the position associated with an address (1) as the capturing region and a right camera 18 having the position associated with an address (2) as the capturing region are arranged so that the capturing regions do not overlap.

Since a color code image (hereinafter, simply referred to as a color code image) added to the work instruction form attached to each of the objects 100 and 102 in FIG. 5A is included in the angle of view of the left camera 18, the color code image is recognized from the image captured by the left camera 18. Since the color code image of the object 106 in FIG. 5A is included in the angle of view of the right camera 18, the color code image is recognized from the image captured by the right camera 18.

However, when the color code image of the object 104 in FIG. 5A is attached to the upper surface of the object 104, for example, the color code image is outside the angle of view of the right camera 18 in the height direction and thus is not recognized from the image captured by the right camera 18.

FIG. 5B illustrates the installation positions of the cameras 18 arranged such that a left camera 18 having the position associated with an address (1) as the capturing region, a center camera 18 having the position associated with an address (2) as the capturing region, and a right camera 18 that captures the position associated with an address (3) have overlapping capturing regions.

FIG. 5B is an example in which the center camera 18 whose angle of view includes the object 104, which is not included in the angle of view of the left camera 18 and the angle of view of the right camera 18 in FIG. 5A, is additionally installed. Since the color code image of the object 104 in FIG. 5B is included in the angle of view of the center camera 18, the color code image is recognized from the image captured by the center camera 18.

However, at the installation positions of the cameras 18 in FIG. 5B, the color code image of the object 102 in the capturing region where the angles of view of the left camera 18 and the center camera 18 overlap is recognized from both the images captured by the left camera 18 and the center camera 18. In the example of FIG. 5B, when the color code image is recognized from the image captured by the left camera 18, the position of the object 102 is determined to be the address (1). When the color code image is recognized from the image captured by the center camera 18, the position of the object 102 is determined to be the address (2).

Therefore, for example, in a case where the plurality of cameras 18 sequentially capture images, the address identification information indicating the position of the object 102 that has not moved from the capturing region where the angles of view of the left camera 18 and the center camera 18 in FIG. 5B overlap each other is unnecessarily updated by the cameras 18 that has captured the images. For this reason, in the example of FIG. 5B, the address identification information indicating the position of the object 102 is not stable.

Figure 6:
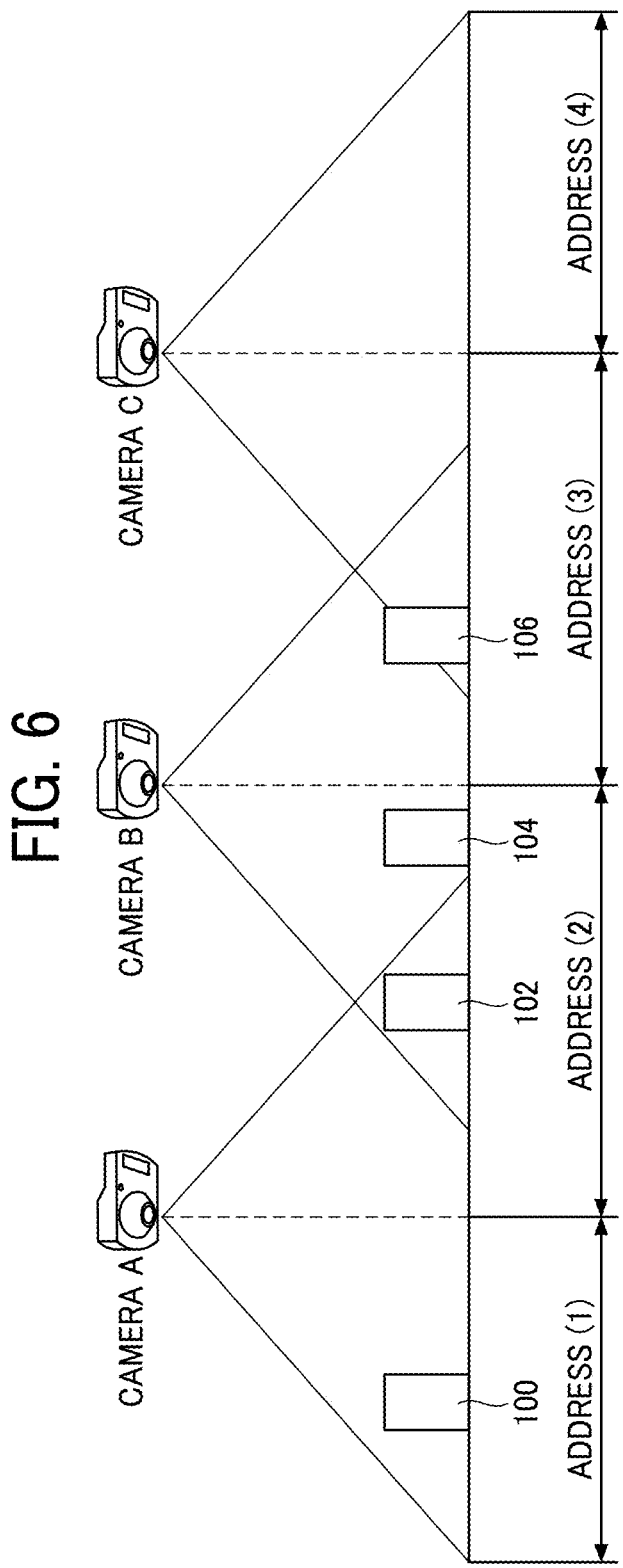
FIG. 6 is a diagram illustrating an example of relation between installation positions of cameras and address identification information.

Therefore, in this embodiment, the relation between the installation positions of the cameras 18 and the address identification information is set as illustrated in FIG. 6. FIG. 6 is a diagram illustrating an example of a relation between installation positions of cameras and address identification information.

As illustrated in FIG. 6, different pieces of address identification information are assigned to regions divided into left, right, upper, and lower with respect to the center so that the pieces of address identification information are switched at a position near the center (substantially center) of the angle of view of each camera 18. In the example of FIG. 6, addresses (1) and (2) are assigned to the angle of view of a camera A, addresses (2) and (3) are assigned to the angle of view of a camera B, and addresses (3) and (4) are assigned to the angle of view of a camera C.

Accordingly, in the example of FIG. 6, even if the color code image of the object 102 in the capturing region where the angles of view of the cameras A and B overlap is recognized from both the images captured by the cameras A and B, the color code image is determined to have the same address (2). For this reason, in the example of FIG. 6, even in a case where the plurality of cameras A to C sequentially capture images, the content of the address identification information indicating the position of the object 102 that has not moved from the capturing region where the angles of view of the cameras A and B overlap does not change from the address (2). Thus, the address identification information indicating the position of the object 102 is stabilized.

Next, a description is given of an example in which four cameras A to D capture nine positions of 3×3 to which addresses (1) to (9) are assigned. FIG. 7 is a diagram illustrating an example of the relation between capturing regions of cameras and address identification information.

As illustrated in FIG. 7, the captured image of each of the cameras A to D is divided into four parts with reference to the center of the angle of view. The cameras A to D are installed such that capturing regions of adjacent cameras partially overlap. The cameras A to D are also installed such that a capturing region of one of the adjacent cameras does not exceed the center of the angle of view of another one of the adjacent cameras.

Figure 7A:
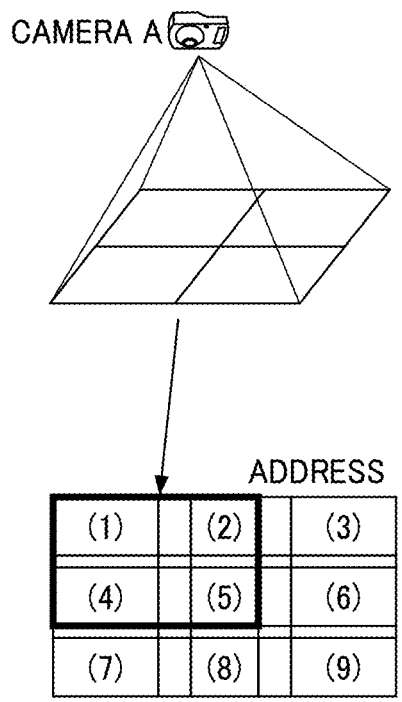
FIGS. 7A, 7B. 7C, and 7D are diagrams illustrating an example of relation between capturing regions of cameras and address identification information.

FIG. 7A illustrates an example in which the camera A is installed so as to capture images at positions to which addresses (1), (2), (4), and (5) are assigned. Each of four divided images obtained by dividing the image captured by the camera A captures a position to which a different address is assigned. For example, the upper-left divided image of the captured image captures the position to which the address (1) is assigned. The upper-right divided image of the captured image captures the position to which the address (2) is assigned. The lower-left divided image of the captured image captures the position to which the address (4) is assigned. The lower-right divided image of the captured image captures the position to which the address (5) is assigned.

Figure 7B:
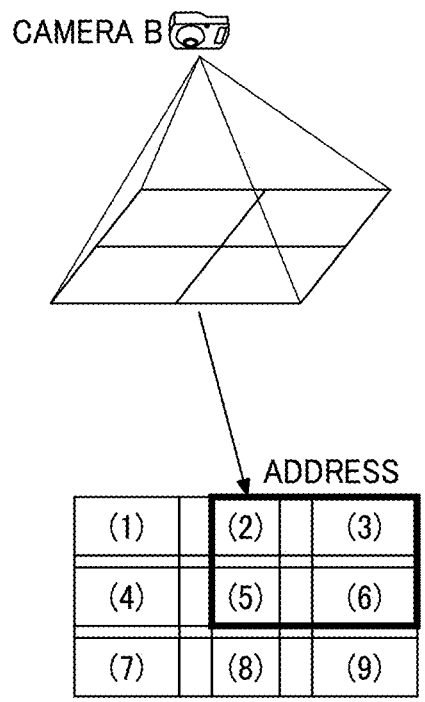

FIG. 7B illustrates an example in which the camera B is installed so as to capture images at positions to which addresses (2), (3), (5), and (6) are assigned. Each of four divided images obtained by dividing the image captured by the camera B captures a position to which a different address is assigned. For example, the upper-left divided image of the captured image captures the position to which the address (2) is assigned. The upper-right divided image of the captured image captures the position to which the address (3) is assigned. The lower-left divided image of the captured image captures the position to which the address (5) is assigned. The lower-right divided image of the captured image captures the position to which the address (6) is assigned.

Figure 7C:
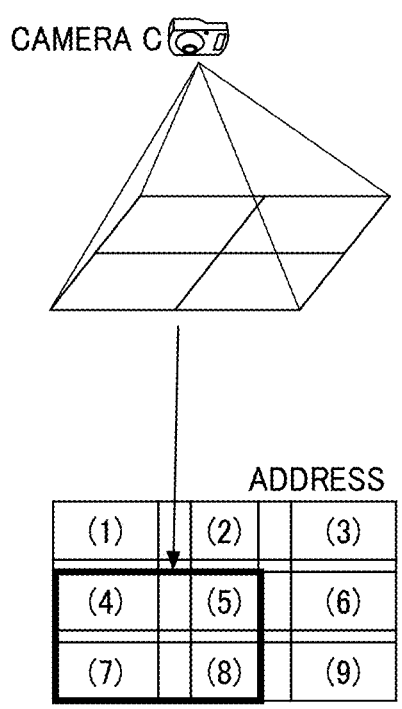

FIG. 7C illustrates an example in which the camera C is installed so as to capture images at positions to which addresses (4), (5), (7), and (8) are assigned. Each of four divided images obtained by dividing the image captured by the camera C captures a position to which a different address is assigned. For example, the upper-left divided image of the captured image captures the position to which the address (4) is assigned. The upper-right divided image of the captured image captures the position to which the address (5) is assigned. The lower-left divided image of the captured image captures the position to which the address (7) is assigned. The lower-right divided image of the captured image captures the position to which the address (8) is assigned.

Figure 7D:
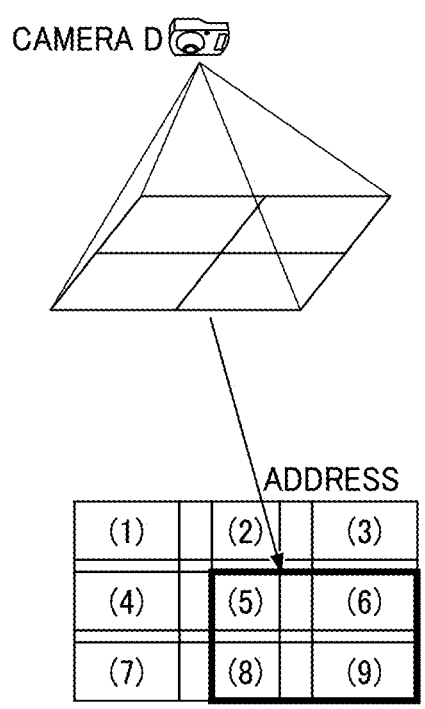

FIG. 7D illustrates an example in which the camera D is installed so as to photograph the positions to which the addresses (5), (6), (8), and (9) are given. Each of four divided images obtained by dividing the image captured by the camera D captures a position to which a different address is assigned. For example, the upper-left divided image of the captured image captures the position to which the address (5) is assigned. The upper-right divided image of the captured image captures the position to which the address (6) is assigned. The lower-left divided image of the captured image captures the position to which the address (8) is assigned. The lower-right divided image of the captured image captures the position to which the address (9) is assigned.

Processing

Hereinafter, a description is given of a preparation process necessary for achieving the management of the work processes of the job in the printing factory by grasping the position of the color code image in the information processing system 12 according to the present embodiment and a management process for achieving the management of the work processes of the job in the printing factory by grasping the position of the color code image.

FIG. 8 is a flowchart illustrating an example of a preparation process of the information processing system according to the present embodiment. In step S10, a user uploads, for example, a map image of a printing factory including a range in which the position of an object to be managed is managed. The UI unit 30 of the work process management system 14 receives an operation for designating the map image from a user. The address setting unit 32 receives designation of the map image by the user.

In step S12, the UI unit 30 may display a grid setting screen 1000 as illustrated in FIG. 9, for example, and may receive a setting necessary for dividing the map image into squares from the user.

FIG. 9 is an image diagram illustrating an example of the grid setting screen. On the grid setting screen 1000 illustrated in FIG. 9, the user can manually input the number of squares in grid by the number of columns×the number of rows. In the grid setting screen 1000 illustrated in FIG. 9, the number of squares can also be automatically set based on the capturing range (for example, 2 m×2 m) of the camera 18 in response to the user's input of the width and depth of the floor or the floor space. For example, in the case of a floor of width 40 m×depth 20 m, squares of 20 columns×10 rows are automatically assigned to the map image. The UI unit 30 may receive, from the user, editing of squares automatically assigned to the map image. By the user's input to the grid setting screen 1000, for example, as illustrated in the map image of the grid setting screen 1000 of FIG. 9, the UI unit 30 additionally displays the grid so that the divided squares can be visually recognized.

In step S14, the UI unit 30 displays, for example, an address setting screen 1100 as illustrated in FIG. 10, and receives, from the user for each work process, setting of squares in the range in which the position of the object to be managed is managed among squares of the map image.

FIG. 10 is an image diagram illustrating an example of the address setting screen. For example, in the address setting screen 1100 of FIG. 10, the user can select a work process to be associated with a square from a process list 1102 and specify, with a mouse or the like, a range of squares of a place where the work process is to be arranged. For example, in the example of the map image of FIG. 10, the range specification of squares corresponding to work processes A to G has been received from the user, and the range specification of the squares corresponding to the work process H is being received.

The address setting unit 32 assigns address identification information to squares of a place where a work process is arranged among squares of the map image and associates job process information for identifying the work process with the address identification information.

In step S16, the user installs the plurality of cameras 18 so as to capture squares (squares corresponding to the work processes A to L of the job) in the range in which the position of the object to be managed is managed among squares of the map image according to the manners illustrated in FIGS. 5 and 6. Note that the timing at which the plurality of cameras 18 are installed is not limited to the timing in the flowchart of FIG. 8, and may be another timing.

Figure 11:
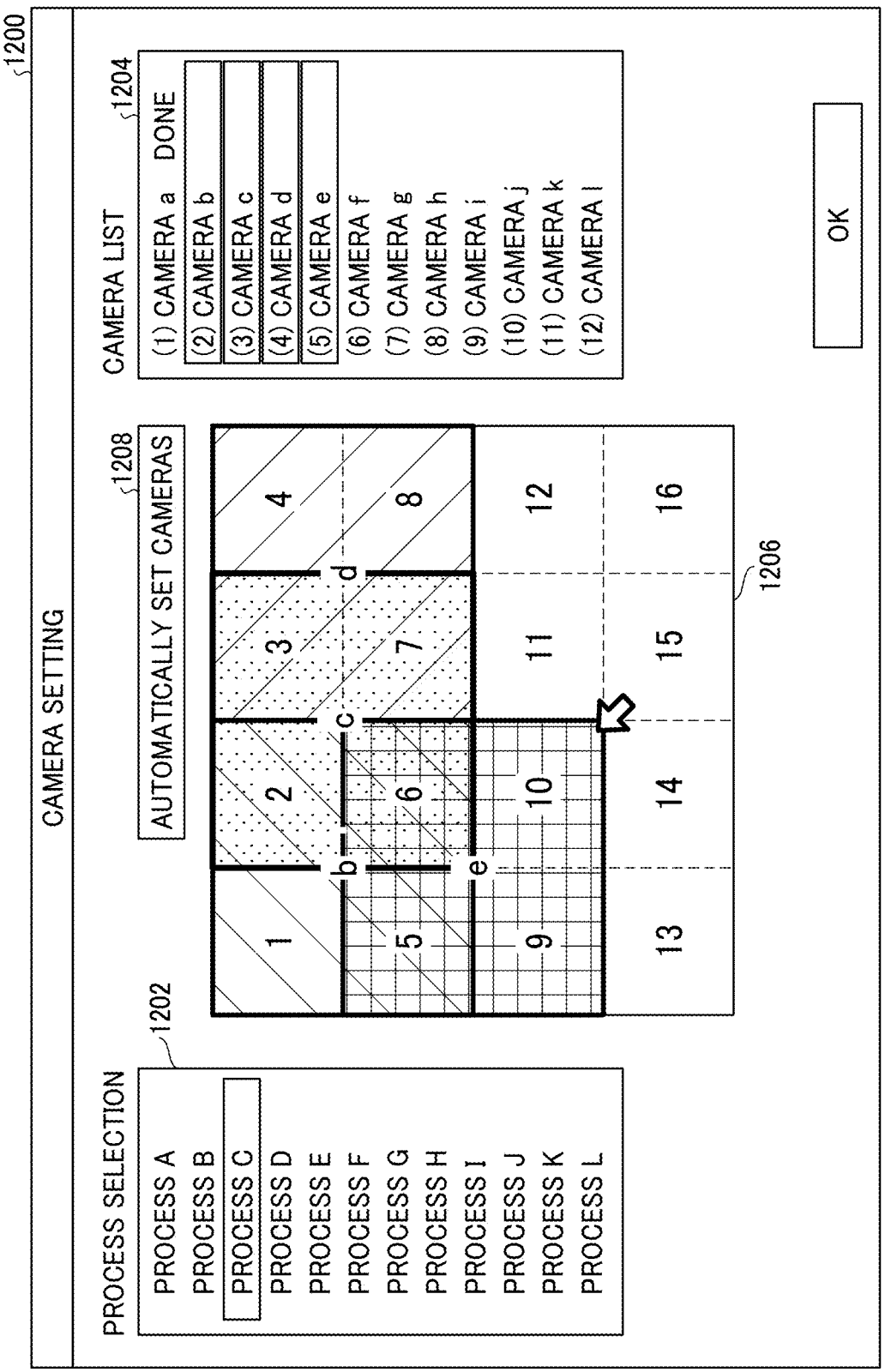
FIG. 11 is an image diagram illustrating an example of a camera setting screen.

In step S18, the UI unit 30 displays a camera setting screen 1200 as illustrated in FIG. 11, for example, and allocates the camera 18 that captures the squares of each work process. FIG. 11 is an image diagram illustrating an example of a camera setting screen.

For example, in the camera setting screen 1200 of FIG. 11, when the user selects one work process from a process selection field 1202, a plurality of squares in which the work process is arranged are displayed in a camera arrangement field 1206. In FIG. 11, 16 squares of 4×4 in which the work process C is arranged are displayed as an example.

The user selects cameras 18 to be arranged in a plurality of squares displayed in the camera arrangement field 1206 from a camera list 1204, and specifies the range of four squares of 2×2 in which the cameras 18 are arranged with a mouse or the like. Note that the camera list 1204 may display cameras associated with other work processes in a grayed-out manner or with a completion mark(s).

For example, in the camera setting screen 1200 of FIG. 11, among squares of address identification information "1" to "16" associated with the work process of "process C", "camera b" is arranged in address identification information "1", "2", "5", and "6", "camera c" is arranged in address identification information "2", "3", "6", and "7", "camera d" is arranged in address identification information "3", "4", "7", and "8", and "camera e" is arranged in address identification information "5", "6", "9", and "10".

Note that the camera setting screen 1200 of FIG. 11 includes an "automatically set cameras" key 1208, and the cameras 18 may be automatically arranged as illustrated in the camera arrangement field 1206 of FIG. 11, for example, by receiving a pressing operation of a key 1208 from the user. In the case of the work process of 16 squares of 4×4 illustrated in the camera arrangement field 1206 of FIG. 11, nine cameras 18 are arranged. The number of cameras 18 to be arranged is (n−1)×(m−1) when the squares of the work process are n×m.

The user operates the camera setting screen 1200 of FIG. 11 to set the address identification information of squares captured by the divided images of the plurality of cameras 18. The address setting unit 32 can set the address identification information of squares for each divided region in the captured image of each camera 18. The address setting unit 32 can associate the camera identification information, the address identification information, and the job process information with each of the four divided image obtained by dividing the captured image of each of the cameras 18.

Through the process of the flowchart of FIG. 8, the address setting unit 32 can store setting information as illustrated in FIG. 12 in the setting information storage unit 50. FIG. 12 is a diagram illustrating an example of the configuration of setting information according to the present embodiment.

The setting information in FIG. 12 associates camera identification information, address identification information, a region of a divided image in a captured image, and job process information with each other. The camera identification information is an example of identification information for identifying the camera 18. The address identification information is an example of identification information for identifying squares divided from the map image. The region of the divided image in the captured image is an example of identification information for identifying or cutting out and distinguishing a region of a divided image in the captured image captured by the camera 18. The job process information is an example of identification information for identifying a work process.

Using the setting information illustrated in FIG. 12, the work process management system 14 can specify the address identification information of the squares captured by the divided images of the cameras 18 and the job process information for identifying the work process at the positions of the squares. In the setting information of FIG. 12, according to the manner illustrated in FIGS. 6 and 7, a plurality of cameras 18 are set to redundantly capture an actual location corresponding to the positions of squares in a map image to which the same address identification information is assigned, such as an upper-right divided image of an image captured by the camera A and an upper-left divided image of an image captured by the camera B.

Management Processing For example, work processes of a job in a printing factory include printing, cutting, folding, bookbinding, inspection, and temporary storage. The camera 18 is installed so as to be able to capture an image of a management area that is a range in which an object to be managed is placed in the work processes of the job. The information processing system 12 according to the present embodiment attaches a work instruction form to which a color code image capable of specifying a job ID is added onto an object to be managed such as a printed matter and causes the camera 18 to capture the work instruction form, to manage the progress of a job including a plurality of work processes.

The work instruction form to which the color code image is added is created, for example, as follows. The management unit 36 of the work process management system 14 selects a color code ID to be used from the color-code management table storage unit 52, and manages the selected color code ID and a job ID of a job for creating a work instruction form in association with each other.

The color code image generation unit 38 generates a color code image from the color code ID associated with the job ID using a technique described in, for example, Japanese Unexamined Patent Application Publication No. 2017-199306, Japanese Unexamined Patent Application Publication No. 2020-024658, or U.S. Patent Application Publication No. 2020-034592 which is incorporated by reference herein. The color-code-added work-instruction-form creation unit 40 creates a work instruction form to which a color code image is added using the generated color code image.

The print instruction unit 42 instructs the printer 16 to print the work instruction form (color-code-added work instruction form) to which the color code image is added. The printer 16 prints the work instruction form to which the color code image is added by an instruction from the print instruction unit 42.

For example, in a printing factory, after a printed matter is output by work processes of printing, a work instruction form to which a color code image is added is attached on the printed matter. After being attached on the printed matter which is an example of the object to be managed, the work instruction form to which the color code image is added is captured by the cameras 18 in the work processes of the job. As described above, in the job management system 1 according to the present embodiment, a color code image of a work instruction form attached on a printed matter, which is an example of an object to be managed, is captured in work processes of a job.

In the job management system 1 according to the present embodiment, the job status of the job status information stored in the job management table storage unit 54 is updated by the processing illustrated in FIG. 13 when the work instruction form to which the color code image is added is captured by the cameras 18.

FIG. 13 is a flowchart illustrating an example of management processing of the information processing system according to the present embodiment. In step S30, the captured image acquisition unit 44 of the work process management system 14 acquires a captured image from the camera 18.

In step S32, the color code recognition unit 46 performs recognition processing of a color code image from the captured image acquired by the captured image acquisition unit 44 in accordance with a procedure described in, for example, Japanese Unexamined Patent Application Publication No. 2017-199306 and Japanese Unexamined Patent Application Publication No. 2020-024658 or U.S. Patent Application Publication No. 2020-034592 which is incorporated by reference herein. When recognizing the color code image in step S34, the color code recognition unit 46 determines that the color code image is included in the captured image, and decodes the color code ID encoded in the color code image. Thereafter, the color code recognition unit 46 provides, for example, camera identification information for identifying the camera 18 that has captured the color code image and the decoded color code ID to the management unit 36.

For example, the management unit 36 that is provided with the camera identification information for identifying the camera 18 that has captured the color code image and the decoded color code ID performs the processing of steps S36 to S42. If the color code recognition unit 46 does not determine that a color code image is included in the captured image, the management unit 36 skips the processing of steps S36 to S42.

In step S36, the management unit 36 reads the setting information of the camera 18 that has captured the color code image from the setting information illustrated in FIG. 12. In step S38, the management unit 36 specifies the region of a divided image in the captured image in which the color code image is recognized from the regions of the captured image. In step S40, the management unit 36 performs update processing of job status information as illustrated in FIG. 14, for example, using the address identification information and job process information associated with the specified divided image.

FIG. 14 is a diagram illustrating an example of the configuration of job status information according to the present embodiment. The job status information illustrated in FIG. 14 manages address identification information, job process information, and status in association with each other. The job of the work instruction form in which the color code image is recognized in the step S32 is managed, using the job status information, as being in the position (squares) of the address identification information and the work process of the job process information that are associated with the divided image in the captured image in which the color code image has been recognized.

Figure 15:
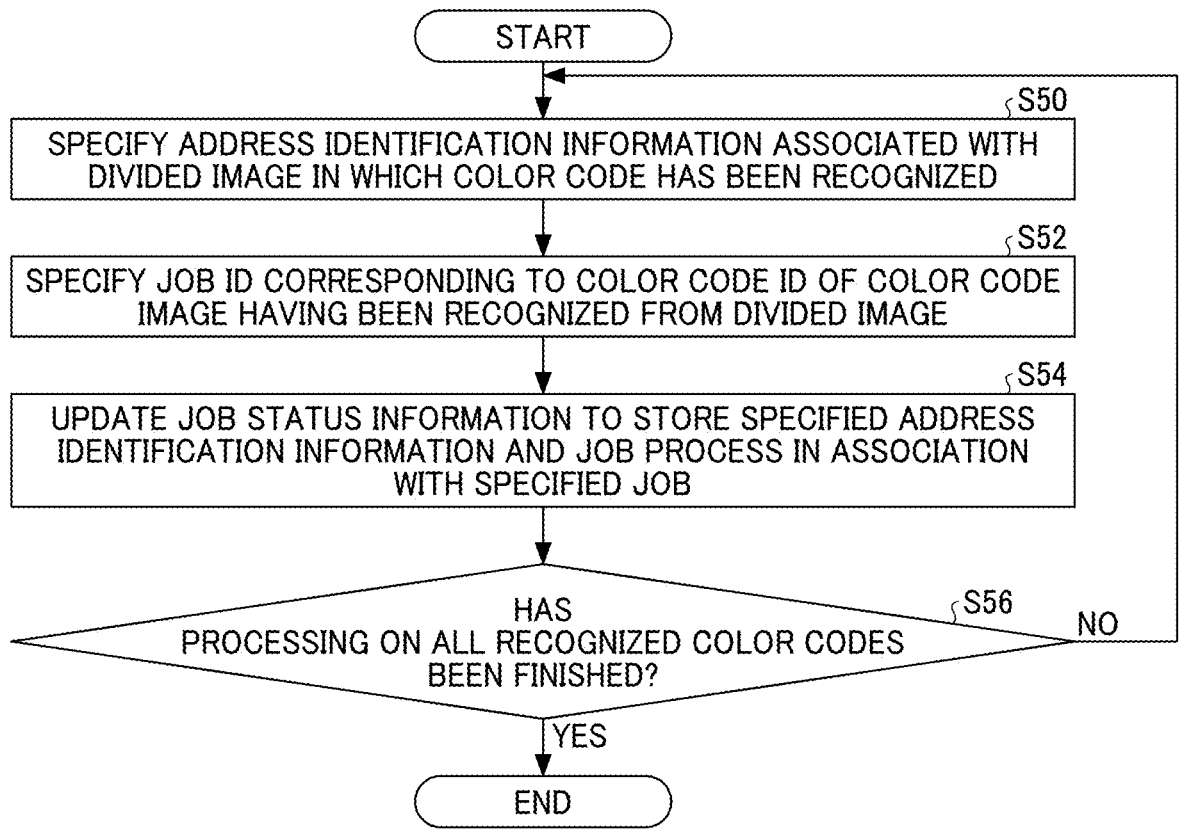
FIG. 15 is a flowchart illustrating an example of update processing of job status information in a job management system according to an embodiment of the present disclosure.

The update processing of the job status information in step S40 is executed by, for example, the process illustrated in FIG. 15. FIG. 15 is a flowchart illustrating an example of the update processing of the job status information in the job management system according to the present embodiment.

In step S50, the management unit 36 of the work process management system 14 refers to the setting information stored in the setting information storage unit 50 and specifies the address identification information and the job process information associated with the divided image obtained by recognizing the color code image.

In step S52, the management unit 36 refers to the color code management table stored in the color-code management table storage unit 52 and specifies the job ID corresponding to the color code ID of the color code image recognized from the divided image.

In step S54, the management unit 36 updates the job status information as illustrated in FIG. 14 so as to store the address identification information and the job process specified in step S50 and the job ID specified in step S52 in association with each other. The management unit 36 repeats the processing of steps S50 to S56 until the processing on all the color code images recognized from the captured image ends.

Note that the procedure of the management process of the job management system 1 illustrated in the flowchart of FIG. 13 is an example, and may be performed by the procedure illustrated in FIG. 16, for example. FIG. 16 is a flowchart illustrating an example of the management process of the job management system according to the present embodiment. In the work process management system 14 that performs the management process illustrated in FIG. 16, a captured image is provided from the captured image acquisition unit 44 to the management unit 36.

In step S70, the captured image acquisition unit 44 of the work process management system 14 acquires a captured image from the camera 18. In step S72, the management unit 36 is provided with the captured image from the captured image acquisition unit 44. The management unit 36 reads the setting information of the camera 18 that has captured the captured image, from the setting information in FIG. 12.

In step S74, the management unit 36 uses the setting information of FIG. 12 read in step S72 to identify the region of a divided image in the captured image in which the color code image is recognized. The management unit 36 requests the color code recognition unit 46 to perform recognition processing of a color code image for each region of the specified divided image.

The color code recognition unit 46 performs recognition processing of a color code image for each region of the divided image requested by the management unit 36 according to a procedure described in, for example, Japanese Unexamined Patent Application Publication No. 2017-199306 and Japanese Unexamined Patent Application Publication No. 2020-024658 or U.S. Patent Application Publication No. 2020-034592 which is incorporated by reference herein. When recognizing the color code image, the color code recognition unit 46 determines that the color code image is included in the divided image, and decodes the color code ID encoded in the color code image. Then, the color code recognition unit 46 returns the decoded color code ID to the management unit 36.

For example, when the management unit 36 receives the decoded color code ID from the color code recognition unit 46, the management unit 36 determines that there is a region of a divided image in which a color code image is recognized in step S76, and performs processing in step S78. If the management unit 36 does not determine in step S76 that there is a region of the divided image in which the color code image is recognized, the management unit 36 skips the processing of step S78.

In step S78, the management unit 36 performs update processing of job status information, for example, as illustrated in FIG. 14 using the address identification information and the job process information associated with the divided image in the captured image in which the color code image is recognized.

FIG. 17 is a diagram illustrating an example of the configuration of job status information in a case where the update processing of the job status information using an image captured by the camera B is performed after the update processing of the job status information using an image captured by the camera A. In the example of FIG. 17, even if there is an object to be managed that has not moved from the capturing region where the angles of view of the cameras A and B overlap, the same address identification information is specified by the update processing of the job status information using the images captured by the cameras A and B.

Accordingly, according to the job management system 1 of the present embodiment, even if there is an object to be managed that has not moved from the capturing region where the angles of view of the cameras A and B overlap, the contents of the address identification information indicating the position of the object to be managed do not change due to the update processing of the job status information using the images captured by the cameras A and B. Thus, the position of the object to be managed can be stably managed.

Further, the job management system 1 according to the present embodiment can provide the user with the contents of the work processes of the job managed by grasping the position of the color code image, for example, by the procedure illustrated in FIG. 18. FIG. 18 is a flowchart illustrating an example of a map display process of the job management system according to the present embodiment.

In step S100, the UI unit 30 displays a map image, for example, by receiving a display operation of the map image from the user. The map image is a map image of a printing factory or the like including a range in which the position of an object to be managed is managed, and is a map image designated in the preparation process.

In step S102, the UI unit 30 receives an input operation of a job ID of an object to be managed whose position is to be searched for from the user. In step S104, the management unit 36 searches the job status information as illustrated in FIG. 14, and specifies the address identification information and the job process information of the position where the object to be managed corresponding to the input job ID is present.

Figure 19:
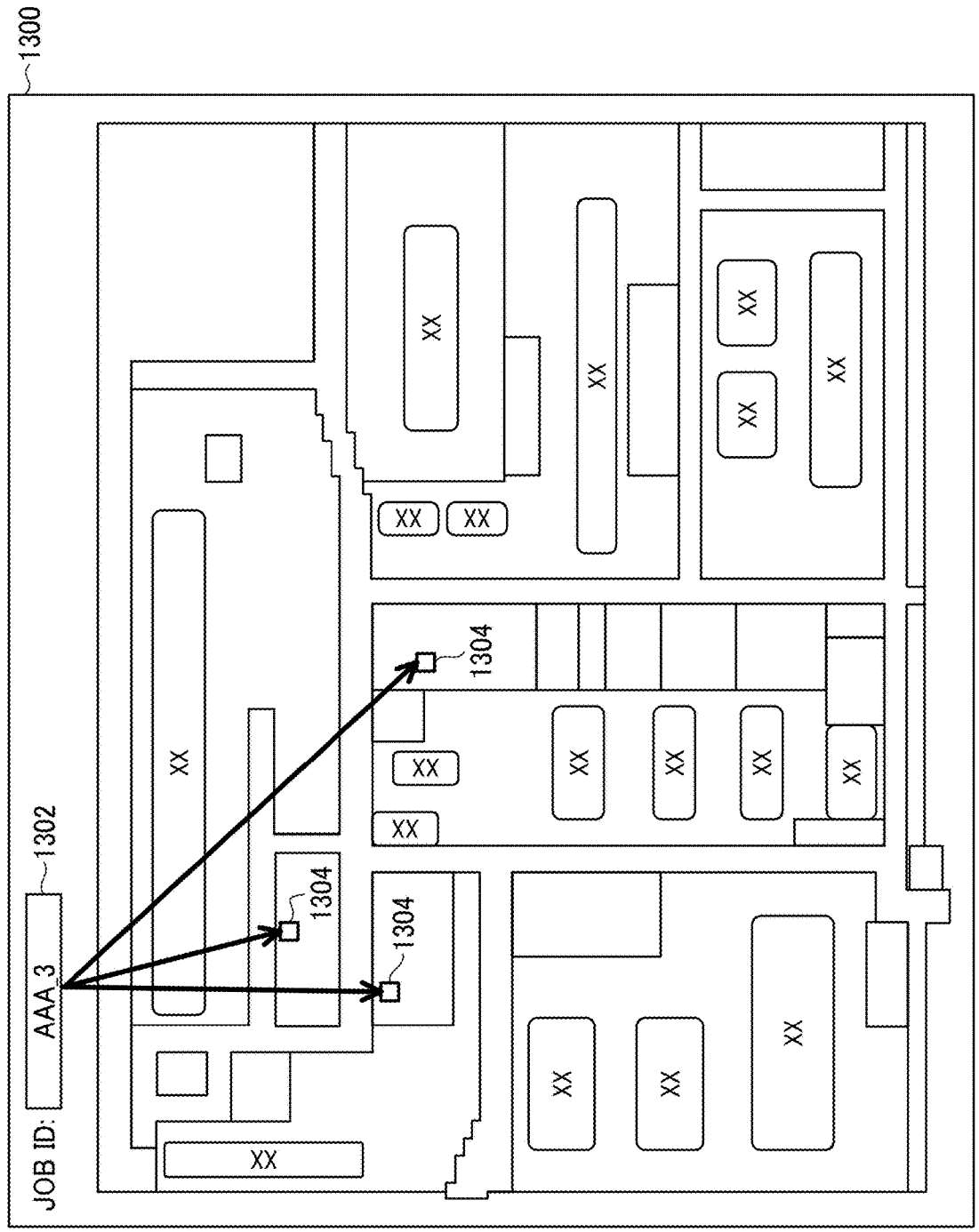
FIG. 19 is an image diagram illustrating an example of a map screen of a job management system according to an embodiment of the present disclosure.

In step S106, the management unit 36 displays the location of the object to be managed corresponding to the job ID with a marker 1304 as illustrated in FIG. 19, for example, in accordance with the address identification information and the job process information of the position where the object to be managed is present, which is specified in step S104. FIG. 19 is an image diagram illustrating an example of a map screen of the job management system according to the present embodiment. A map screen 1300 of FIG. 19 has a job ID input field 1302.

In the map screen 1300 of FIG. 19, the location of the job retrieved by the job ID is visually displayed on the map image by markers 1304. Note that the map screen 1300 may not only display the current location of the job retrieved by the job ID with the markers 1304, but also visually display the locus of movement. As described above, on the map screen 1300 of FIG. 19, the user can check the status of the object to be managed to which the work instruction form is attached and can track the object to be managed.

When a plurality of color code images are recognized from the same square, job information 1306 of a plurality of jobs may be displayed as illustrated in FIG. 20 by, for example, mouse-over or clicking a marker 1304. FIG. 20 is an image diagram illustrating an example of another map screen of the job management system according to the present embodiment.

Second Embodiment

The above-described first embodiment is a technology achieved by a work instruction form to which a code image to be attached to an object to be managed such as a printed matter is added. This technology can be applied to a technology of a transport system represented by, for example, an automated guided vehicle (AGV).

For example, in a transport system that transports an article, a work instruction form to which a color code image is added is attached to the article, and the article being transported is captured by cameras 18, whereby the work process of the article being transported can be managed by a transport device. In addition, since the position of the transport device that is transporting the article and the transport destination of the article can be specified, the transport system can also control the movement of the transport device that transports the article.

Third Embodiment

Although the above-described first and second embodiments have been described as being applied to technologies of management of work processes of a job in a printing factory and a transport system, embodiments of the present disclosure can also be applied to, for example, management of work processes of articles flowing on a belt conveyor. If the technology of the present embodiment is provided for managing work processes of articles flowing on a belt conveyor, the articles flowing on the belt conveyor can be tracked, and branching of the belt conveyor can also be controlled.

The system according to an embodiment of the present disclosure can be applied to a place such as a factory or a warehouse where a work process for handling an object to be managed exists. To capture a code image by using a plurality of cameras in order to capture the code image without omission when capturing a place where the code image corresponding to an object to be managed exists and managing the position and working situation of the object to be managed. At this time, when the cameras are installed at a distance from each other without overlapping the capturing regions of the cameras, for example, as the distance from the center of the angle of view (view angle center) of the camera increases, the region that can be captured in the height direction decreases. Accordingly, the code image protrudes from the captured region in the height direction, and there may occur a place where the code image cannot be identified. For this reason, in order to prevent the code image from protruding in the height direction, the cameras are arranged close to each other, for example, at intervals of several meters, and the capturing regions overlap with each other. Thus, the region that can be capture in the height direction is increased over the entire capturing location, and the code image can be easily identified.

Further, in a case where a code image is present in an capturing region overlapped by a plurality of cameras, the code image is recognized in each of images captured by the plurality of cameras. At this time, if the progress of the work process is managed based on the camera of the captured image in which the code image is recognized by associating the camera with each work process, for example, the following failure may occur. That is, when each of a plurality of cameras captures images at predetermined time intervals (for example, at intervals of several minutes), the code image existing in the overlapping capturing region may be recognized by the captured images of each of the plurality of cameras and the position may be unnecessarily updated every several minutes, which may make the position and the work situation unstable. Thus, one piece of address identification information can be commonly set for regions of different captured images captured by a plurality of image capturing devices, thereby preventing the system from becoming unstable.

Embodiments of the present disclosure are not limited to the embodiments specifically disclosed above, and various modifications and changes can be made without departing from the above-described teachings. The work process management system 14 is an example of an information processing apparatus according to an embodiment of the present disclosure.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An information processing system comprising:
a plurality of image capturing devices disposed to capture images of a management area;
an information processing apparatus configured to recognize a code image corresponding to an object to be managed in the management area, from a captured image captured by the plurality of image capturing devices, and manage a location of the object to be managed; and processing circuitry configured to:
set address identification information associated with position information in the management area to a region of the captured image captured by the plurality of image capturing devices;
based on recognition of the code image in the region of the captured image, manage the position information associated with the address identification information set for the region, as a location of the object to be managed corresponding to the code image; and
commonly set one piece of the address identification information associated with the position information in the management area, for regions of different captured images captured by the plurality of image capturing devices.

2. The information processing system according to claim 1,
wherein the processing circuitry is configured to set the address identification information to each of divided regions divided at substantially a center of an angle of view of the captured image captured by the plurality of image capturing devices.

3. The information processing system according to claim 1,
wherein the captured image is divided into divided images and the address identification information is set to each of the divided images,
wherein the divided images are four divided images obtained by dividing the captured image into four, and the divided images obtained from adjacent ones of the plurality of image capturing devices include a common region, and
wherein divided images obtained from one of the adjacent ones of the plurality of image capturing devices do not exceed a center of an angle of view of another one of the adjacent ones.

4. The information processing system according to claim 1,
wherein the processing circuitry is configured to divide an image of the management area into squares on a grid and set the address identification information to the squares in a range in which a position of the object is managed.

5. The information processing system according to claim 4,
wherein in response to reception of a search request for the object to be managed from a user, the processing circuitry is configured to display the position of the object on the image of the management area, based on a position on the grid.

6. The information processing system according to claim 5,
wherein the position information in the management area includes coordinate information of the squares to which the address identification information is assigned in the image representing a layout map of the management area.

7. The information processing system according to claim 1,
wherein the position information in the management area is associated with a work process for the object.

8. The information processing system according to claim 1,
wherein the processing circuitry is configured to, based on recognition of the code image in the region of the captured image, store position information of the code image in the management area as a location of the object and store a work process associated with the position information as a process in which the object to be managed is located, using the address identification information corresponding to the region, to manage management information including the location and a work situation of the object, and
wherein in a case where the code image is recognized in the regions of the different captured images for which the one piece of the address identification information is commonly set, the processing circuitry is configured to update the management information such that the object corresponding to the code image is located at a same position and in a same work process.

9. A position management method to be executed by an information processing system that includes a plurality of image capturing devices disposed to capture images of a management area and an information processing apparatus configured to recognize a code image corresponding to an object to be managed in the management area, from a captured image captured by the plurality of image capturing devices, and manage a location of the object, the method comprising:
setting address identification information associated with position information in the management area to a region of the captured image captured by the plurality of image capturing devices;
based on recognition of the code image in the region of the captured image, managing the position information associated with the address identification information set for the region, as a location of the object corresponding to the code image; and
commonly setting one piece of the address identification information associated with the position information in the management area, for regions of different captured images captured by the plurality of image capturing devices.

10. A non-transitory recording medium storing a plurality of instructions which, when executed by one or more processors, cause the processors to perform the position management method of claim 9.

11. An information processing apparatus configured to recognize a code image corresponding to an object to be managed in a management area, from a captured image captured by a plurality of image capturing devices disposed to capture images of the management area, to manage a location of the object, the information processing apparatus comprising processing circuitry configured to:
set address identification information associated with position information in the management area to a region of the captured image captured by the plurality of image capturing devices;
based on recognition of the code image in the region of the captured image, manage the position information associated with the address identification information set for the region, as a location of the object to be managed corresponding to the code image; and
commonly set one piece of the address identification information associated with the position information in the management area, for regions of different captured images captured by the plurality of image capturing devices.

* * * * *